United States Patent [19]

Thome et al.

[11] Patent Number: 5,385,714
[45] Date of Patent: Jan. 31, 1995

[54] SYNTHETIC, CRYSTALLINE ALUMINOSILICATE, METHOD FOR ITS PREPARATION AS WELL AS USE

[75] Inventors: Roland Thome; Arno Tissler, both of Bonn; Hubertus Schmidt, Eitorf; Gunter Winkhaus, Konigswinter; Klaus Unger, Mainz, all of Germany

[73] Assignee: Vereinigte Aluminium-Werke Aktiengesellschaft, Bonn, Germany

[21] Appl. No.: 908,539

[22] Filed: Jun. 29, 1992

Related U.S. Application Data

[63] Continuation of Ser. No. 549,185, Jul. 6, 1990, abandoned.

[30] Foreign Application Priority Data

Jul. 6, 1989 [DE] Germany .................. 3922181

[51] Int. Cl.⁶ .................. C01B 33/26; B01J 29/06
[52] U.S. Cl. .................. 423/328.2; 423/329.1; 423/332; 502/64
[58] Field of Search .............. 423/328, 326, 329, 330, 423/328.2, 329.1, 332; 502/77, 64

[56] References Cited

U.S. PATENT DOCUMENTS

| | | | |
|---|---|---|---|
| 3,702,886 | 11/1972 | Argauer et al. | 423/328 |
| 4,175,114 | 11/1979 | Plank et al. | 423/328 |
| 4,199,556 | 4/1980 | Plank et al. | 423/328 |
| 4,257,885 | 3/1981 | Grose et al. | 423/328 |
| 4,341,748 | 7/1982 | Plank et al. | 423/328 |
| 4,562,055 | 12/1985 | Arika et al. | 423/328 |
| 4,687,654 | 8/1987 | Taramasso et al. | 423/328 |
| 4,891,199 | 1/1990 | Latovrette et al. | 423/328 |
| 4,900,529 | 2/1990 | Sanchez et al. | 423/328 |
| 4,954,326 | 9/1990 | Onodera et al. | 423/328 |
| 4,994,251 | 2/1991 | Plank et al. | 423/328 |
| 5,102,644 | 4/1992 | Plank et al. | 423/700 |

FOREIGN PATENT DOCUMENTS

| | | | |
|---|---|---|---|
| 21025/88 | 2/1989 | Australia . | |
| 21674 | 1/1981 | European Pat. Off. | 423/329 |
| 21675 | 1/1981 | European Pat. Off. | 423/329 |
| 26963 | 4/1981 | European Pat. Off. | 423/329 |
| 0040104 | 5/1981 | European Pat. Off. . | |
| 0104006 | 8/1983 | European Pat. Off. . | |
| 207186 | 2/1984 | German Dem. Rep. | 423/328 |
| 57-7819 | 1/1982 | Japan | 423/329 |

OTHER PUBLICATIONS

Abstract for EP 104006, K. Igawa et al., High Silica Mordenite(s) Obtained by Reacting Amorphous Silica Acid and an Alumina Source.

Abstract for JP 59039716, Synthetic Zeolite Manufactured from Silicic Acid, Alumina and Sodium Oxide in Water, Using Predetermined Ratios.

Abstract for JP 58045111, Crystalline Aluminosilicate Useful for Converting Organic Material.

*Primary Examiner*—Anthony McFarlane
*Attorney, Agent, or Firm*—Darby & Darby

[57] ABSTRACT

Synthetic crystalline aluminosilicate is prepared by an inorganic process from a reaction mixture, which contains, in an aqueous alkaline medium $SiO_2$ and $Al_2O_3$ or their hydrated derivatives or alkali silicates and aluminates, mineralizers and optionally seeding crystals, the reaction mixture containing: $SiO_2/Al_2O_3$ in molar ratio of 15–40, $OH^-/SiO_2$ in molar ratio 0.1–0.2, and $H_2O/SiO_2$ in molar ratio 20–60. The aluminosilicate produced by the process has a chemical composition expressed in molar ratios as: $0-3\ M_2O:Al_2O_3:15-40\ SiO_2:0-40\ H_2O$, where M represents an alkali cation. The aluminosilicate is useful in the preparation of catalysts and adsorbents.

16 Claims, 3 Drawing Sheets

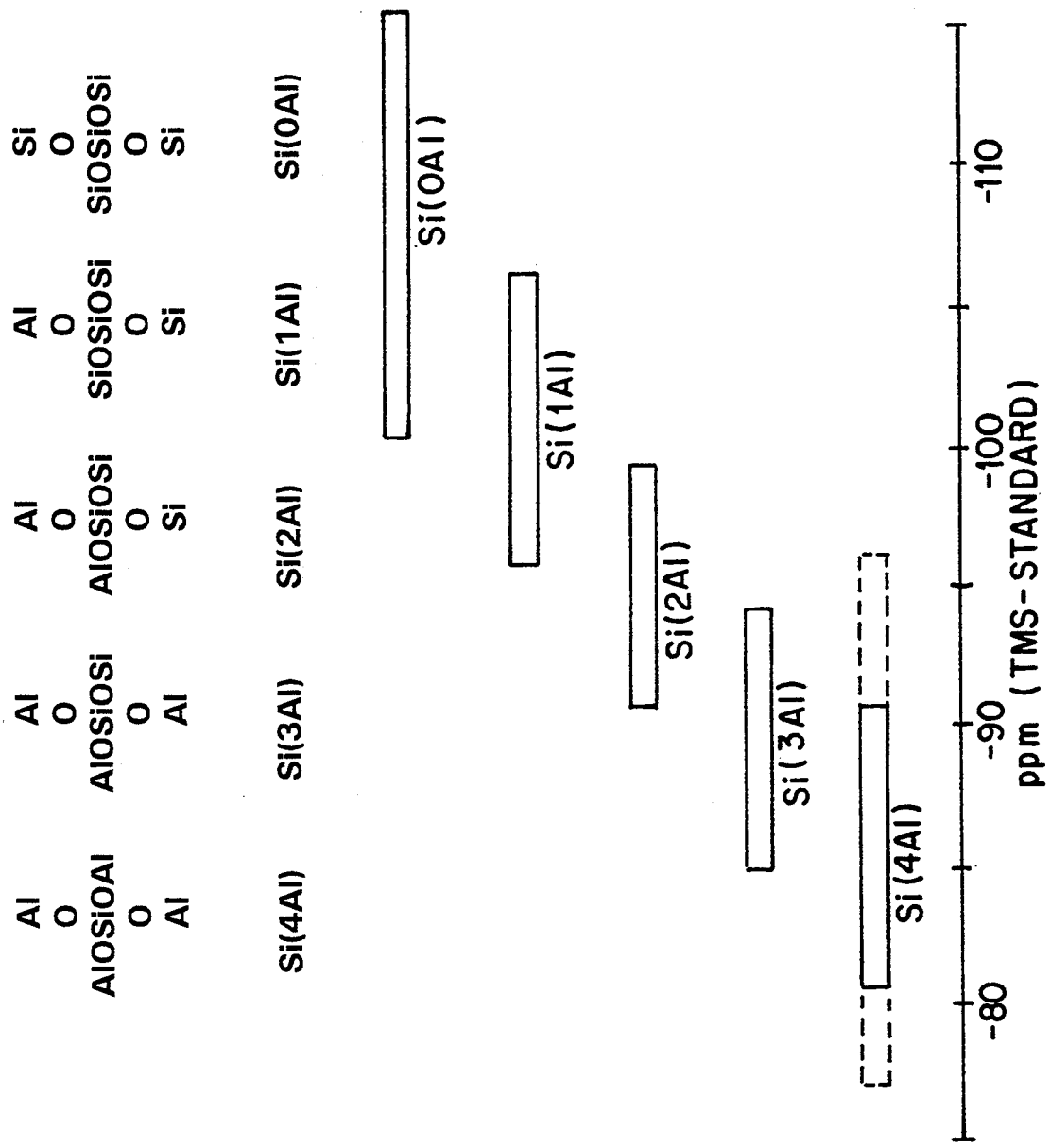

SYNTHETIC, CRYSTALLINE ALUMINOSILICATE, METHOD FOR ITS PREPARATION AS WELL AS USE

This application is a continuation of application Ser. No. 07/549,185 filed on Jul. 6, 1990, now abandoned.

FIELD OF THE INVENTION

The present invention relates to a new synthetic, crystalline aluminosilicate (zeolite), a method for its preparation, as well as to its use.

BACKGROUND OF THE INVENTION

Zeolites are microporous, crystalline aluminosilicates. They are distinguished by a series of special properties: they have a defined cavity system with opening sizes of 0.3 to 0.9 nm; and they are cation exchangers. In the H form, they have a high solid-state acidity. Their hydrophobic character can be controlled by the ratio of silicon to aluminum; and they exhibit high thermal stability.

Synthetic zeolites are used at the present time, for example, as adsorbents for separating processes, as replacements for phosphates in detergents, and as catalysts in petrochemical processes. Moreover, their potential for use in environmentally beneficial technologies is high.

As selective heterogeneous catalysts, they help in producing valuable organic products more selectively with the use of less energy and with fewer undesirable by-products. Natural raw materials such as crude oil and natural gas or secondary raw materials such as bioalcohol, which can only be used incompletely at the present time, can be converted to a much greater extent to useful products with the help of these catalysts. Zeolites furthermore find use as catalysts for the removal of nitrogen oxides from exhaust gases, as energy storers and for the energy-saving separation of materials.

The synthesis of zeolites of the pentasil family, which have a high silica content, was described for the first time in 1967 by Argauer and Landolt (See, U.S. Pat. No. 3,702,886).

The preparation of these, materials succeeded, however, only if organic structure guiding compounds were added to the synthesis mixture. Generally, tetraalkylammonium compounds, such as tetrapropylammonium bromide were used for this purpose. In subsequent years, it was discovered that it is possible to carry out this synthesis with a number of other organic substances such as secondary amines, alcohols, ethers, heterocyclic compounds, and ketones.

All these various known methods for the synthesis of zeolites have a series of serious disadvantages, which preclude environmentally safe production on an industrial scale.

The organic materials used are toxic and easily flammable.

Since the synthesis must be carried out under hydrothermal conditions and at a high pressure, generally in autoclaves, an escape of these organic materials into the atmosphere can never be completely prevented.

As a result, these known methods of producing zeolites are hazardous both for the operating personnel and for the environment surrounding the production site. The effluent from the production of zeolites also contains toxic materials and therefore requires expensive and careful disposal in order to prevent contamination of the environment. Moreover, the organic portions present in the lattice must be removed by combustion at high temperatures. These organic materials, possibly decomposed or including combustion products, thus reach the ambient atmosphere. Moreover, this removal of organic products by combustion can cause additional damage to the lattice structure of the zeolite catalyst and thus impair its catalytic properties.

All of these disadvantages have contributed to the fact that the industrial production of this useful catalyst has up until now been carried out only in small batches.

In recent years, some new production methods have been disclosed in the patent literature, in which the use of these organic materials could be omitted (See, e.g., U.S. Pat. No. 4,257,885). However, these production methods proceed very slowly (several days) and generally only incompletely to the desired product. Moreover, the appearance of undesirable secondary phases generally can not be excluded.

INCORPORATION BY REFERENCE

The complete disclosure of each of the U.S. Patents discussed above, namely U.S. Pat. Nos. 4,257,885 and 3,702,886, is incorporated herein by reference.

SUMMARY OF THE INVENTION

It is an object of the present invention to provide a strictly inorganic method of zeolite synthesis, which practically excludes the formation of secondary phases and can be carried out in a short time.

This object is achieved by an inventive method which involves the production of new aluminosilicates by hydrothermal crystallization from an inorganic aqueous alkaline reaction mixture with the following molar composition:

$SiO_2/Al_2O_3 = 15-40$,
$OH^-/SiO_2 = 0.1-0.2$, and
$H_2O/SiO_2 = 20-60$.

The materials used for the preparation are $SiO_2$ and $Al_2O_3$ or their hydrated derivatives or alkali silicates and aluminates and mineral acid. Preferably, however, the relatively inexpensive starting materials of sodium water glass, aluminum or sodium salts and sulfuric acid are used.

After the starting materials are mixed, hydrothermal crystallization is carried out at temperatures above 100° C. over a period of 1-100 hours. The aluminosilicate formed is filtered and processed further to catalysts or adsorbents.

The synthetic aluminosilicates, produced with this inventive method, moreover, have physical and chemical characteristics which make them clearly distinguishable from similar products produced differently.

The new zeolites produced with the inventive method have a chemical composition which can be described in molar ratios in the following manner: 0–3 $M_2O$: $Al_2O_3$:15–40 $SiO_2$:0–40 $H_2O$ wherein M represents an alkali cation. Moreover, the new zeolites show an X-ray diffraction diagram which contains certain definable minimum lattice distances.

Furthermore, the inventive zeolites show specific absorption bands in NMR spectrum analysis.

The new zeolites are useful in the preparation of catalysts and adsorbents.

BRIEF DESCRIPTION OF THE DRAWING

With these and other objects in view, which will become apparent in the following detailed description, the present invention, which is shown by example only, will be clearly understood in connection with the accompanying drawing, in which:

FIG. 3 is a diagram showing Si-29 shift for Si(nAl) where n=1 through 4. This figure illustrates the range of the $^{29}$Si chemical shifts for si(nAl) structured units in zeolites where n=1 through 4. The dotted line shows the newly discovered rather large range of the chemical shift for Si(4Al) structured units in synthetic zeolites, which contain various sodium-clathrate-compositions.

DESCRIPTION OF THE PREFERRED EMBODIMENTS

The zeolites produced with the inventive method have a chemical composition which can be described in molar ratios in the following manner: 0–3 $M_2O:Al_2O_3$:15–40 $SiO_2$:0–40 $H_2O$ wherein M represents an alkali cation.

The preferred alkali cation for use in the invention is sodium, but the other alkali cations (e.g. Lithium and Potassium etc.) may also be employed.

These zeolites can be ion exchanged with the help of a mineral acid, an ammonium compound, other proton suppliers, or with other cations.

In conjunction with the above chemical composition, the zeolites produced according to the invention show an X-ray diffraction diagram which contains at least the lattice distances that are listed in Table 1, below.

In addition to the above chemical composition and the lattice distances listed in Table 1, the zeolites produced according to the invention have absorption bands in the silicon-29 high-resolution solid-state nuclear magnetic resonance spectrum at about $-100$, $-106$, $-112$ and $-116$ ppm, relative to a tetramethylsilane standard. Using these criteria, the new aluminosilicate can be distinguished from previously known zeolites (See, FIGS. 1 and 2).

Figure 1:
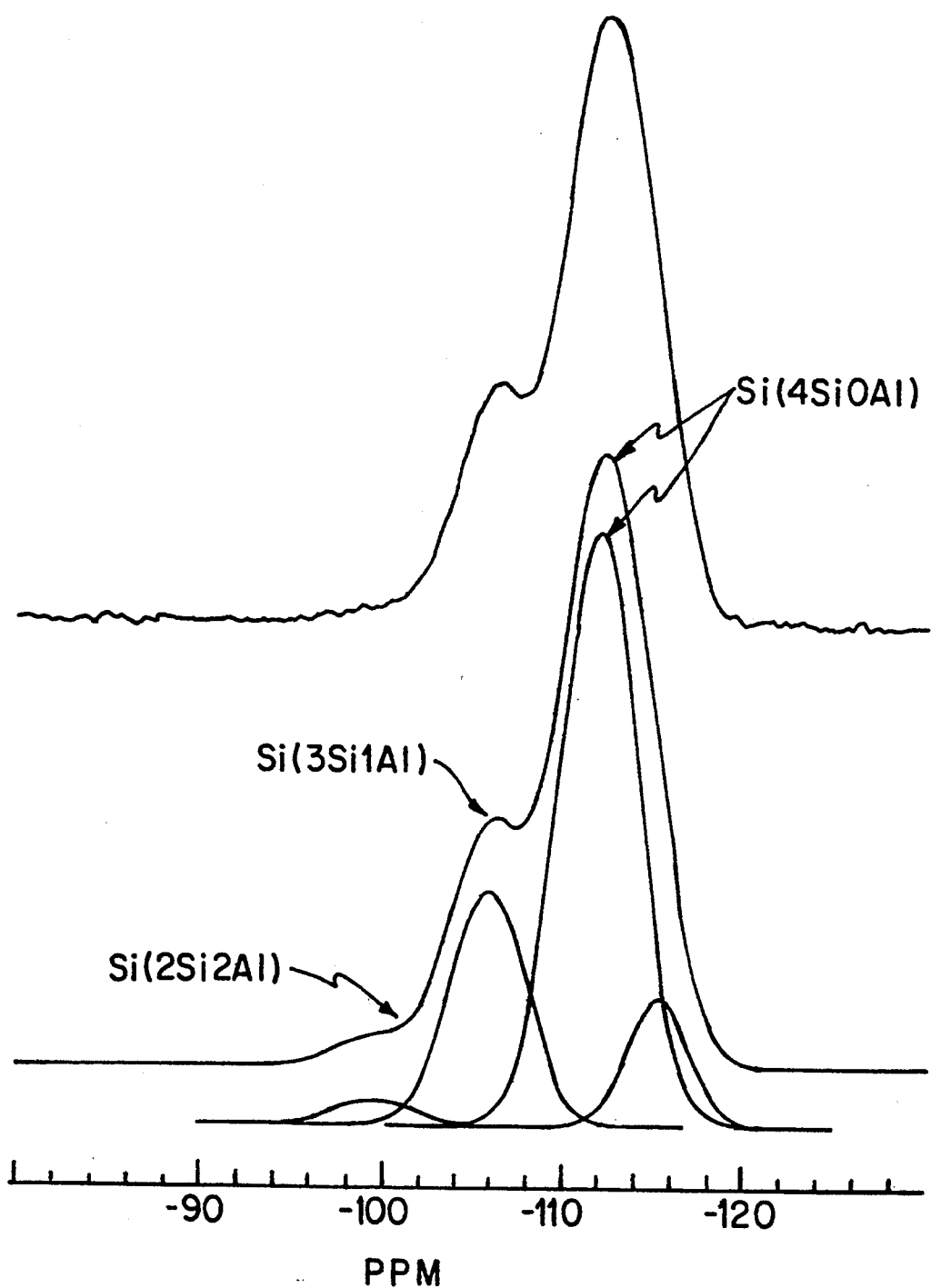
FIGS. 1 and 2 are diagrams showing Si-29 NMR absorption bands.
Figure 2:
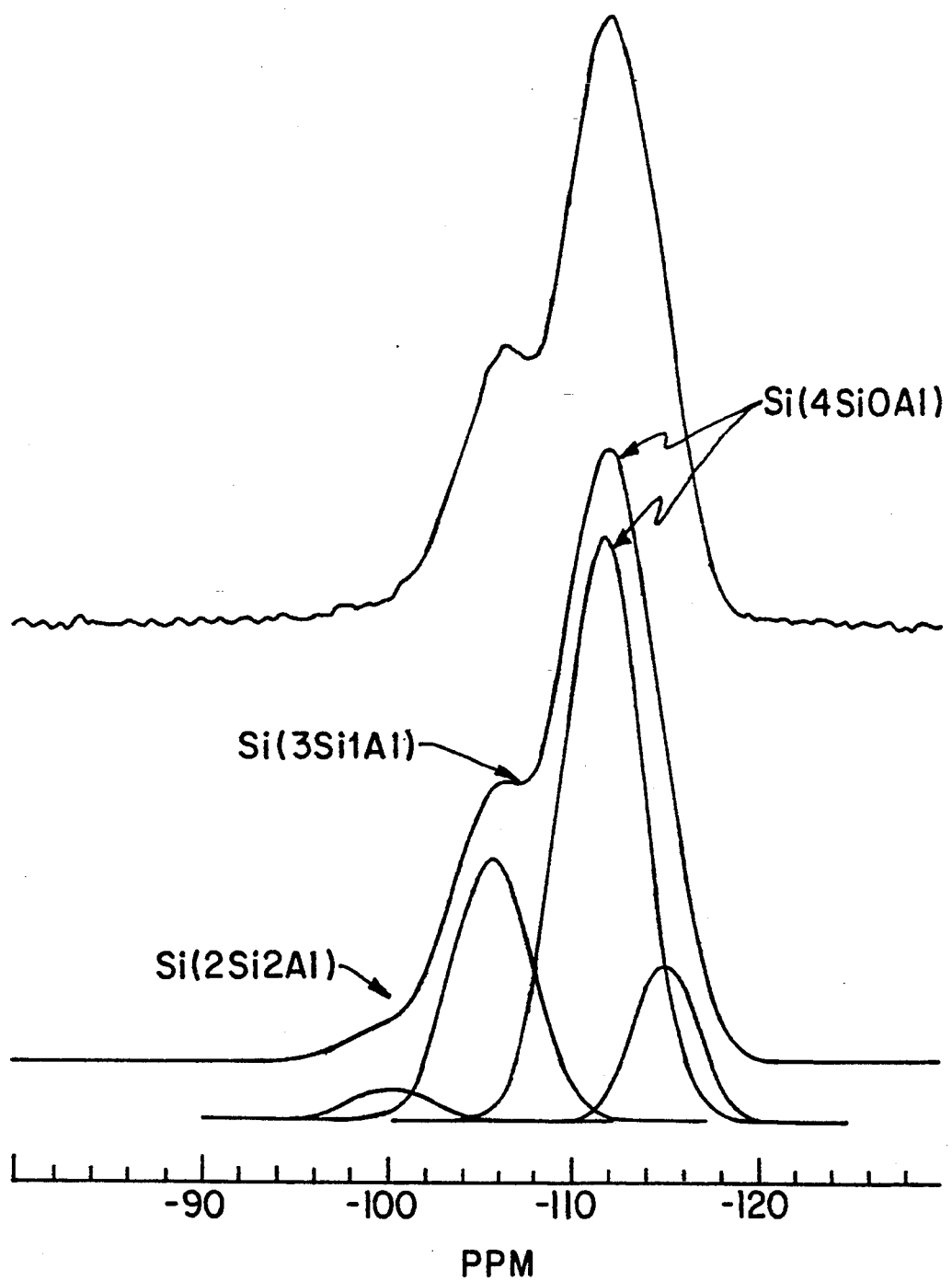

The high-resolution solid-state nuclear magnetic resonance measurements shown in FIGS. 1 and 2 were performed with a Bruker 400 MSL spectrometer with a magnetic field of 9.4 T. The Si-29 high-resolution NMR measurements were carried out at a frequency of 79.5 MHz with a pulse length of 4 microseconds, a pulse interval of 5 seconds, an rpm of 3 KHz and a scan number of 10,000. The Bruker GLINFIT program was used for separating the peaks of the spectra measured.

In order to make certain that the absorption bands at about $-100$ ppm actually originated from silicon atoms which are linked over oxygen atoms with 2 silicon atoms and 2 aluminum atoms, additional photographs of the samples were taken with the help of the cross-polarization technique. These photographs excluded the possibility that the absorption bands belonged to silanol groups and confirmed the occurrence of the structural unit described.

The solid-state high-resolution nuclear magnetic resonance technique has been developed in recent years into a capable, powerful characterization method for such materials as silicates and particularly for zeolites (see, e.g., Englehardt, G.; Michel, D.; *High-Resolution-Solid-State NMR of Silicates and Zeolites*, Chichester; Wiley 1987).

Si-29, Al-27 and O-17 high-resolution solid-state nuclear magnetic resonance spectroscopy have been used for structural investigations of zeolites since 1971. New findings concerning the structure and chemistry of zeolites have been obtained particularly from silicon-29 high-resolution solid-state nuclear magnetic resonance spectroscopy.

For example, it recently became possible to resolve signals from crystallographically different silicon lattice atoms and to assign structure parameters (See, FIG. 3; and Klinowski, J.; Ann. Rev. Mater. Sci.; 1988, 18, 189–218).

Because of their high silica content, synthetic zeolites of the pentasil family have essentially silicon lattice atoms which are linked over oxygen bridges once again only with silicon atoms. This structural unit can be detected by a signal in the silicon-29 high-resolution solid-state nuclear magnetic resonance spectrum between $-112$ and $-116$ ppm.

Moreover, a further, weaker signal at about $-106$ ppm is frequently observed in zeolites of the pentasil family. The intensity of this signal increases with the aluminum content. This signal can be assigned to a silicon atom, which is linked over oxygen bridges with 3 silicon atoms and 1 aluminum atom.

Further signals, which can be assigned to silicon atoms which are linked to 2, 3 or 4 aluminum atoms, were not observed in zeolites with a pentasil structure since conventional methods of synthesizing pentasils with a molar ratio of $SiO_2$ to $Al_2O_3$ of less than 40 or 30 lead only to partially crystalline products. In particular, it is also possible with the inventive method described below to produce products of pure phase and with a high catalytic activity in this area. Using the inventive method,, structure units arise in the lattice in which the silicon atoms are linked over oxygen atoms with 2 silicon atoms and 2 aluminum atoms (absorption bands at approximately $-100$ ppm).

Because of these structure units, the zeolite catalysts produced pursuant to the invention, have a far higher catalytic activity than do similar pentasils which have been produced with conventional methods.

FIG. 3 shows areas of the chemical Si-29 shift for Si(nAl) structure units in zeolites. The dotted line shows the newly discovered extremely wide region of the chemical shift for Si(Al4Al) structure units in synthetic sodalites, which contain different salt clathrate compounds.

METHOD OF PREPARATION

Pursuant to the invention, these new aluminosilicates are produced by the hydrothermal crystallization from a strictly inorganic aqueous alkaline reaction mixture with the following molar composition:

$SiO_2/Al_2O_3 = 15-40$,
$OH^-/SiO_2 = 0.1-0.2$, and
$H_2O/SiO_2 = 20-60$.

A preferred embodiment, however, has the molar composition:

$SiO_2/Al_2O_3 = 18-30$,
$OH^-/SiO_2 = 0.13-0.18$, and
$H_2O/SiO_2 = 25-40$.

The materials used for the preparation are $SiO_2$ and $Al_2O_3$ or their hydrated derivatives or alkali silicates and aluminates and mineral acid. Preferably, however, the relatively inexpensive starting materials of sodium water glass, aluminum or sodium salts and sulfuric acid are used.

After the starting materials are mixed, hydrothermal crystallization is carried out at temperatures above 100° C. over a period of 1–100 hours. The aluminosilicate formed is filtered and processed further to catalysts or adsorbents.

The inventive method will be better understood by reference to the following examples:

EXAMPLE 1

A reaction batch, consisting of solutions of sodium water glass, aluminum sulfate, sodium sulfate, and sulfuric acid, with the molar ratios of $SiO_2/Al_2O_3 = 30$,
$OH^-/SiO_2 = 0.14$, and
$H_2O/SiO_2 = 30$ is heated in a stirred autoclave to a reaction temperature of 185° C. and treated hydrothermally for 24 hours. The solid product is filtered off and dried at 110° C. The dry substance consists of a purephase aluminosilicate with an X-ray diffraction spectrum with at least the d values listed in Table 1, below. The chemical composition of the product, expressed in molar ratios, is:

1.1 $Na_2:Al_2O_3:31$ $SiO_2:6$ $H_2O$.

The proportions of the individual absorption bands, obtained from the silicon-29 high-resolution solid-state nuclear magnetic resonance spectra, which are a measure of the different tetrahedral silicon coordinations, are:

| Si(4Si0Al) −112 and −116 ppm 75% | Si(3Si1Al) −106 ppm 23% | Si(2Si2Al) −100 ppm 2% |
|---|---|---|

A portion of the product is ion exchanged repeatedly with ammonium nitrate, activated, filled into a reactor of a normal pressure flow apparatus and investigated for its catalytic properties. The disproportioning of ethylbenzene is used as a test reaction. At a temperature of 250° C. and a reactor load of 0.33/hour, the conversion is 30%.

EXAMPLE 2

A reaction batch, consisting of solutions of sodium water glass, aluminum sulfate, sodium sulfate, and sulfuric acid, with the molar ratios of $Si_2/Al_2O_3 = 27$,
$OH^-/SiO_2 = 0.14$, and
$H_2O/SiO_2 = 30$ is heated in a stirred autoclave to a reaction temperature of 185° C. and treated hydrothermally for 24 hours. The solid product is filtered off and dried at 110° C. The dry substance consists of a purephase aluminosilicate with an X-ray diffraction spectrum with at least the d values listed in Table 1, below. The chemical composition of the product, expressed in molar ratios, is:

1.2 $Na_2O:Al_2O_3:27$ $SiO_2:7$ $H_2O$.

The proportions of the individual absorption bands, obtained from the silicon-29 high-resolution solid-state nuclear magnetic resonance spectra, which are a measure of the different tetrahedral silicon coordinations, are:

| Si(4Si0Al) −112 and −116 ppm 73% | Si(3Si1Al) −106 ppm 24% | Si(2Si2Al) −100 ppm 3% |
|---|---|---|

A portion of the product is ion exchanged repeatedly with ammonium nitrate, activated, filled into a reactor of a normal pressure flow apparatus and investigated for its catalytic properties. The disproportioning of ethylbenzene is used as a test reaction. At a temperature of 250° C. and a reactor load of 0.33/hour, the conversion is 33%.

EXAMPLE 3

A reaction batch, consisting of solutions of sodium water glass, aluminum sulfate, sodium sulfate, and sulfuric acid, with the molar ratios of $SiO_2/Al_2O_3 = 24$,
$OH^-/SiO_2 = 0.14$, and
$H_2O/SiO_2 = 30$ is heated in a stirred autoclave to a reaction temperature of 185° C. and treated hydrothermally for 24 hours. The solid product is filtered off and dried at 110° C. The dry substance consists of a purephase aluminosilicate with an X-ray diffraction spectrum with at least the d values listed in Table 1, below. The chemical composition of the product, expressed in molar ratios, is:

1.1 $Na_2O:Al_2O_3:24$ $SiO_2:7$ $H_2O$.

The proportions of the individual absorption bands, obtained from the silicon-29 high-resolution solid-state nuclear magnetic resonance spectra, which are a measure of the different tetrahedral silicon coordinations, are:

| Si(4Si0Al) −112 and −116 ppm 71% | Si(3Si1Al) −106 ppm 26% | Si(2Si2Al) −100 ppm 3% |
|---|---|---|

A portion of the product is ion exchanged repeatedly with ammonium nitrate, activated, filled into a reactor of a normal pressure flow apparatus and investigated for its catalytic properties. The disproportioning of ethylbenzene is used as a test reaction. At a temperature of 250° C. and a reactor load of 0.33/hour, the conversion is 40%.

The zeolites produced according to the inventive method are useful in the preparation of adsorbents and catalysts.

Although the invention is described and illustrated with reference to a plurality of embodiments thereof, it is to be expressly understood that it is in no way limited to the disclosure of such preferred embodiments but is capable of numerous modifications within the scope of the appended claims.

TABLE 1

| d Values/Interplanar Spacing | Relative Intensity | (%) |
|---|---|---|
| 11.2 ± 0.3 | strong | 52 |
| 10.1 ± 0.3 | strong | 31 |
| 9.8 ± 0.2 | weak | 10 |
| 3.85 ± 0.1 | very strong | 100 |
| 3.83 ± 0.1 | strong | 81 |
| 3.75 ± 0.1 | strong | 50 |
| 3.73 ± 0.1 | strong | 54 |
| 3.60 ± 0.1 | strong | 31 |
| 3.06 ± 0.05 | weak | 16 |
| 3.00 ± 0.05 | weak | 21 |
| 2.01 ± 0.02 | weak | 15 |
| 1.99 ± 0.02 | weak | 20 |

I claim:

1. A method of preparing a pure phase of synthetic, pentasil, crystalline aluminosilicate comprising the steps of
preparing a reaction mixture containing compounds selected from the group consisting of $SiO_2$ and $Al_2O_3$, hydrated derivatives of $SiO_2$ and $Al_2O_3$, or alkali silicates and aluminares, with mineralizers and seeding crystals, in an aqueous alkaline medium which is essentially free of organic substances, wherein the molar ratio of $SiO_2/Al_2O_3$ in said mixture ranges from 15 to about 30 and said mixture has the following molar ratios:
$OH^-/SiO_2 = 0.1-0.2$, and
$H_2O/SiO_2 = 20-60$;
exposing the mixture to hydrothermal crystallization at a temperature above 100° C.; and
recovering the products of crystallization from said mixture, wherein said crystalline products have a silicon-29 high resolution solid state magnetic resonance spectrum with a substantial peak, assignable to silicon atoms linked over oxygen atoms with 2 silicon and 2 aluminum atoms, between $-96$ and $-102$ ppm based on a tetramethylsilane standard and have the following chemical composition:

0-3 $M_2O:Al_2O_3$:15-31 $SiO_2$:0-40 $H_2O$;

wherein M represents an alkali cation.

2. The method as claimed in claim 1 further comprising the step of heating and stirring the reaction mixture to a reaction temperature above 100° C.

3. The method as claimed in claim 1, wherein the molar ratios have the following values:
$SiO_2/Al_2O_3 = 18-30$
$OH^-/SiO_2 = 0.13-0.18$, and
$H_2O/SiO_2 = 25-40$.

4. The method as claimed in claim 2, wherein said hydrothermal crystallization at a temperature above 100° C. is maintained for a period of 1 to 100 hours.

5. The method of claim 1 which comprises recovering said products of crystallization by filtering said mixture and drying said products of crystallization.

6. The method of claim 1, wherein said crystallization temperature is at least about 185° C.

7. The method of preparing a synthetic, crystalline aluminosilicate of claim 1, wherein said silicon-29 high resolution solid-state magnetic resonance peak between $-96$ and $-102$ ppm comprises about 2% or more of the absorptions between $-116$ and $-96$ ppm.

8. The method of preparing a synthetic, crystalline aluminosilicate of claim 1, wherein said crystalline products have 0-3 $M_2O:Al_2O_3$:15-30 $SiO_2$:0-40 $H_2O$.

9. The method of preparing a synthetic, crystalline aluminosilicate of claim 1, wherein said crystalline products have 0-3 $M_2O:Al_2O_3$:15-27 $SiO_2$:0-40 $H_2O$.

10. The method of preparing a synthetic crystalline aluminosilicate of claim 3, wherein said $SiO_2/Al_2O_3$ ranges from 18 to 27.

11. The method of preparing a synthetic crystalline aluminosilicate of claim 1, wherein said recovered zeolites have an X-ray diffraction diagram with the X-ray reflections represented in Table 1.

12. The method of preparing a synthetic crystalline aluminosilicate of claim 9, comprising the step of maintaining alkaline conditions during said preparing step.

13. An pure phase of synthetic, pentasil, crystalline aluminosilicate having the chemical composition 0-3 $M_2O:Al_2O_3$:15-30 $SiO_2$:0-40 $H_2O$;

wherein M represents an alkali cation;
said crystalline aluminosilicate having an X-ray diffraction diagram with X-ray reflections belonging to the following d values:

| d Values/Interplanar Spacing | Relative Intensity | % |
|---|---|---|
| 11.2 ± 0.3 | strong | 52 |
| 10.1 ± 0.3 | strong | 31 |
| 9.8 ± 0.2 | weak | 10 |
| 3.85 ± 0.1 | very strong | 100 |
| 3.83 ± 0.1 | strong | 81 |
| 3.75 ± 0.1 | strong | 50 |
| 3.73 ± 0.1 | strong | 54 |
| 3.60 ± 0.1 | strong | 31 |
| 3.06 ± 0.05 | weak | 16 |
| 3.00 ± 0.05 | weak | 21 |
| 2.01 ± 0.02 | weak | 15 |
| 1.99 ± 0.02 | weak | 20; | and
having a silicon-29 high resolution solid-state nuclear magnetic resonance spectrum with a substantial peak, assignable to silicon atoms linked over oxygen atoms with 2 silicon and 2 aluminum atoms, between $-96$ and $-102$ ppm; and
having a silicon-29 high-resolution solid-state nuclear magnetic resonance spectrum with absorption bands at approximately 100, $-106$, $-112$ and $-116$ ppm based on standard tetramethylsilane; and
wherein said crystalline aluminosilicate being synthesized from an inorganic mixture by hydrothermal reaction.

14. Synthetic, crystalline aluminosilicate as claimed in claim 13, wherein M is a sodium cation.

15. The synthetic, crystalline aluminosilicate of claim 13, wherein said silicon-29 high resolution solidstate magnetic resonance peak between $-96$ and $-102$ ppm comprises about 2% or more of the absorptions between $-116$ and $-96$ ppm.

16. The synthetic, crystalline aluminosilicate of claim 13, wherein said aluminosilicate has the following chemical composition:

0-3 $M_2O:Al_2O_3$:15-27 $SiO_2$:0-40 $H_2O$.

* * * * *